United States Patent
Caren et al.

(10) Patent No.: US 6,264,899 B1
(45) Date of Patent: *Jul. 24, 2001

(54) METHOD AND APPARATUS FOR USING HYDROXYL TO REDUCE POLLUTANTS IN THE EXHAUST GASES FROM THE COMBUSTION OF A FUEL

(75) Inventors: Robert P. Caren, Westlake Village, CA (US); Jack A. Ekchian, Belmont, MA (US)

(73) Assignee: Litex, Inc., West Lake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,098

(22) Filed: Mar. 1, 2000

Related U.S. Application Data (60) Continuation of application No. 09/036,493, filed on Mar. 6, 1998, now Pat. No. 6,048,500, which is a division of application No. 08/768,833, filed on Dec. 18, 1996, now Pat. No. 5,863,413, which is a continuation-in-part of application No. 08/671,955, filed on Jun. 28, 1996, now Pat. No. 5,806,305.

(51) Int. Cl.[7] ....................................... B01J 19/08
(52) U.S. Cl. ...................... 422/186.3; 60/275; 204/164
(58) Field of Search ................... 422/186.3; 60/275; 204/164

(56) References Cited

U.S. PATENT DOCUMENTS

| | | |
|---|---|---|
| 1,333,836 | 3/1920 | Csanyi . |
| 1,725,661 | 8/1929 | McPartland . |
| 1,982,484 | 11/1934 | Runge ........................ 123/119jf124c |
| 5,904,905 | 5/1999 | Dolezal et al. ................ 422/186.04 |
| 6,007,682 | 12/1999 | Hancock et al. ..................... 204/164 |
| 6,048,500 | * 4/2000 | Caren et al. ......................... 204/164 |
| 6,119,455 | 9/2000 | Hammer ................................ 60/301 |
| 3,188,167 | 6/1965 | Specht ........................................ 23/2 |
| 3,896,616 | 7/1975 | Keith et al. ............................ 60/274 |
| 3,979,193 | 9/1976 | Sikich ................................... 55/123 |
| 3,983,021 | 9/1976 | Henis ................................... 204/164 |
| 4,041,922 | 8/1977 | Abe et al. ............................ 123/191 |
| 4,118,193 | 10/1978 | Neti et al. ............................. 422/94 |
| 4,185,316 | 1/1980 | Fleck ................................... 361/230 |
| 4,195,606 | 4/1980 | Wallis, Jr. et al. ............... 123/119 E |
| 4,309,199 | 1/1982 | Suzuki ................................... 55/127 |
| 4,434,771 | 3/1984 | Slomnicki ........................... 123/539 |

FOREIGN PATENT DOCUMENTS

| | | |
|---|---|---|
| 0 366 876 A1 | 5/1990 | (EP) . |
| 0 824 952 A2 | 2/1998 | (EP) . |
| 2481945 | 11/1981 | (FR) . |

(List continued on next page.)

OTHER PUBLICATIONS

Penetrante, et al., "Non–Thermal Plasma Techniques for Pollution Control—Part A: Overview, Fundamentals and Supporting Technologies", (1993) p. 65 (Springer–Verlag, Berlin). No month available.

Rogers et al., "The Removal of Nitric Oxide using a Non–Thermal Plasma Discharge Device", http://www.gnt.nct/–rogersjw/nox/nox.htm1. No date available.

Southwest Research Institute (SwRI) News release, 1996, "SwRI nonthermal plasma reactor neutralizes harmful emissions", http//:www.swri.org/9what/releases/plasma.htm. No month available.

(List continued on next page.)

*Primary Examiner*—Kishor Mayekar
(74) *Attorney, Agent, or Firm*—Pennie & Edmonds LLP (57) ABSTRACT

A method and apparatus are provided for reducing pollutants in the exhaust gases produced from the combustion of a fuel by introducing hydroxyl and associated radicals and oxidizers into at least one of the precombustion and postcombustion gas stream of the combustion engine upstream of the catalytic converter and treating the exhaust gases with the catalytic converter.

38 Claims, 4 Drawing Sheets

U.S. PATENT DOCUMENTS

| | | | |
|---|---|---|---|
| 4,519,357 | 5/1985 | McAllister | 123/539 |
| 4,780,277 | 10/1988 | Tanaka | 422/4 |
| 4,902,487 | 2/1990 | Cooper | 423/215.5 |
| 4,945,721 | 8/1990 | Cornwell et al. | 60/274 |
| 4,954,320 | 9/1990 | Brimingham | 422/186 |
| 4,968,396 | 11/1990 | Harvey | 204/131 |
| 4,979,364 | 12/1990 | Fleck | 60/274 |
| 5,097,665 | 3/1992 | Kammel | 60/275 |
| 5,154,807 | 10/1992 | Harvey | 204/131 |
| 5,284,556 | 2/1994 | Rich | 204/164 |
| 5,402,639 | 4/1995 | Fleck | 60/275 |
| 5,410,871 | 5/1995 | Masters et al. | 60/274 |
| 5,419,123 | 5/1995 | Masters | 60/274 |
| 5,433,832 | 7/1995 | Rich et al. | 204/164 |
| 5,440,876 | 8/1995 | Bayliss et al. | 60/274 |
| 5,474,747 | 12/1995 | Hayashi et al. | 422/177 |
| 5,487,874 | 1/1996 | Gibboney, Jr. | 422/186.03 |
| 5,549,795 | 8/1996 | Gregoire et al. | 104/64 |
| 5,609,736 | 3/1997 | Yamamoto | 204/164 |
| 5,623,819 | 4/1997 | Bowker et al. | 60/39.06 |
| 5,649,507 | 7/1997 | Gregoire et al. | 123/143 |
| 5,655,210 | 8/1997 | Gregoire et al. | 422/186 |
| 5,695,619 | 12/1997 | Williamson et al. | 204/65 |
| 5,711,147 | 1/1998 | Vogtlin et al. | 60/274 |
| 5,746,984 | 5/1998 | Hoard | 422/169 |
| 5,753,087 | 5/1998 | Wang et al. | 204/164 |
| 5,771,683 | 6/1998 | Webb | 60/274 |
| 5,806,305 | 9/1998 | Miller et al. | 60/274 |
| 5,807,466 | 9/1998 | Wang et al. | 204/177 |
| 5,822,981 | 10/1998 | Williamson et al. | 60/275 |
| 5,827,407 | 10/1998 | Wang et al. | 204/164 |
| 5,836,154 | 11/1998 | Williamson et al. | 60/275 |
| 5,843,288 | 12/1998 | Yamamoto | 204/164 |
| 5,843,383 | 12/1998 | Williamson et al. | 422/186.04 |
| 5,845,488 | 12/1998 | Hancock et al. | 60/275 |
| 5,847,494 | 12/1998 | Bayliss et al. | 313/231.31 |
| 5,855,855 | 1/1999 | Williamson et al. | 422/186.04 |
| 5,866,081 | 2/1999 | Williamson et al. | 422/186.04 |
| 5,891,409 | 4/1999 | Hsiao et al. | 423/239.1 |
| 5,893,267 | 4/1999 | Vogtlin et al. | 60/274 |

FOREIGN PATENT DOCUMENTS

| | | |
|---|---|---|
| 4-276167 | 10/1992 | (JP) . |
| 5-332128 | 12/1993 | (JP) . |
| 98/09699 | 3/1998 | (WO) . |
| WO 98/08592 | 3/1998 | (WO) . |

OTHER PUBLICATIONS

Kintaichi, et al., "Selective Reduction of Nitrogen Oxides with Hydrocarbons Over Solid Acid Catalysts in Oxygen Rich Atmoshperes," Catalysis Letters 6 (1990) 239–244. No month available.

*Plasma Exhaust Aftertreatment*, SAE SP–98/1395, Library of Congress Catalog Card No:98–86679, Copyright© 1998 Society of Automotive Engineers, Inc. No month available.

Suhr et al., "Reduction of Nitric Oxide in Flue Gases by Point to Plane Corona Discharge with Catalytical Coatings on the Plane Electrode," Combust. Sci. and Tech., vol. 72. pp. 101–115. No date available.

Penetrante et al., "Comparison of Electrical Discharge Techniques for Nonthermal Plasma Processing of NO in $N_2$," IEEE Transactions on Plasma Science, vol. 23, No. 4, Aug. 1995, 679–687.

Whealton et al., "971718 Non–Thermal Plasma Exhaust Aftertreatment: A Fast Rise–Time Concept," Manuscript based on work performed at the Oak Ridge National Laboratory, managed by Lockheed Martin Energy Research Corporation for the U.S. Dept. of Energy under contract No. DE–AC05–96OR22464, 1–14. No date available.

Fanick et al., "Simultaneous Reduction of Diesel Particulate and $NO_x$ Using a Plasma," SAE Technical Paper Series 942070, 239–246.

Hepburn et al., "The Pulse Flame Combustor Revisited," 962118 Ford Motor Co., 1–36. No date available.

Sztenderowicz et al., of Chevron Research and Technology Co. et al., "Effects of Fuel Sulfur Level on Emissions from Transitional Low Emission Vehicles," 952561, 2067–2082. No date available.

Burch et al., "Mechanism of the Selective Reduction of Nitric Oxide by Propene on Platinum–Based Catalysts in the Presence of Excess Oxygen," Symposium on Nox Reduction before the Division of Petroleum Chemistry, Inc. $207^{th}$ National Meeting, American Chemical Society, San Diego, CA, Mar. 13–18, 1994, pp150–153.

Liu et al., "In Situ XANES Characterization of Cu in Cu–ZSM–5 during Selective Catalytic Reduction of NO by Hydrocarbon," Symposium on Nox Reduction Presented before the Division of Petroleum Chemistry, Inc. $207^{th}$ National Meeting, American Chemical Society, San Diego, CA, Mar. 13–18, 1994, pp107–111.

Yasuda et al., "IR Study of Catalytic Reduction of Nitrogen Monoxide by Propene in the Presence of Oxygen over Ce–Exchanged ZSM–5 Zeolite," Symposium on $NO_x$ Reduction Presented before the Division of Petroleum Chemistry, Inc. 207th National Meeting, American Chemical Society, San Diego, CA, Mar. 13–18, 1994, pp 99–102.

Yamamoto, T. et al., "Control of Volatile Organic Compounds by an ac Energized Ferroelectric Pellet Reactor and a Pulsed Corona Reactor," *IEEE Transactions on Industry Applications*, vol. 128. No. 3, pp528–534 (1992).

Chang, M.B. et al., "Gas–Phase Removal on NO from Gas Streams via Dielectric Barrier Discharges," *Environ. Sci. technol.*, vol. 26, pp777–781 (1992). No month available.

Chang, J–S. Et al., "Corona Discharge Processes," *IEEE Transaction on Plasma Science*, vol. 19, pp1152–1165 (1991). No month available.

Eliasson, B., "Nonequilibrium Volume Plasma Chemical Processing," *Environ. Sci. Tehcnol.*, vol. 19 pp1063–1077 (1991). No month available.

Hamada et al., "Selective reduction of nitrogen monoxide with propane over alumina and HZSM–5 zeolite," "Effect of oxygen and nitrogen dioxide intermediate," Applied Catalysis, 70(1991) L15–L20. No month available.

Hamada et al., "Transition metal–promoted silica and alumina catalysts for the selective reduction of nitrogen monoxide with propane," Applied Catalysis, 70 (1991) L1–L8. No month available.

Mizuno, A., et al. "A Method for the Removal of Sulfur Dioxide from Exhaust Gas Utilizing Pulsed Streamer Corona for Electron Energization," IEEE Transactions on Industry Applications, 1986, vol. 22, p516 No month available.

* cited by examiner

Adding Hydroxyl to the combustion flow stream at least one point upstream or at the catayltic converter for treating exhaust gases produced by a combustion engine to at least reduce one pollutant from incomplete Combustion and/or oxides of nitrogen Treating the exhaust gases with a high surface receptacle such as a catalytic converter

FIG. 9

METHOD AND APPARATUS FOR USING HYDROXYL TO REDUCE POLLUTANTS IN THE EXHAUST GASES FROM THE COMBUSTION OF A FUEL

CROSS REFERENCE TO RELATED APPLICATIONS

The present application is a continuation of application Ser. No. 09/036,493 filed Mar. 6, 1998, now U.S. Pat. No. 6,048,500; which is a division of U.S. application Ser. No. 08/768,833, filed Dec. 18, 1996, now U.S. Pat. No. 5,863,413; which is a continuation-in-part of U.S. application Ser. No. 08/671,955 filed Jun. 28, 1996 entitled "Method and Apparatus for Reducing Pollutants", now U.S. Pat. No. 5,806,305.

BACKGROUND OF THE INVENTION

1. Field of the Invention

The present invention generally relates to a method and apparatus for reducing pollutants in the exhaust gases produced by the combustion of fuels. More particularly, the invention relates to such a method and apparatus wherein the reduction in pollutants is achieved by introducing hydroxyl radicals "OH" and other free radical intermediaries and oxidizers such as O, H, $HO_2$ and $H_2O_2$ into the precombustion or postcombustion gas stream of a combustion engine.

2. Background

As is well-known in the art, an internal combustion engine draws in ambient air which is mixed with fuel for combustion in a combustion chamber or cylinder and the resulting exhaust gases are expelled. Ignition of the air/fuel mixture in the cylinder is typically achieved by an ignition device, such as, for example, a spark plug or the like, or adiabatic compression to a temperature above the fuel's ignition point.

In certain internal combustion engines, such as for example, gasoline engines commonly in use today, air is inducted via an air intake duct or port which conveys the ambient air to a carburetor or a fuel injection arrangement where the air is mixed with fuel to create an air/fuel mixture. The air/fuel mixture is then conveyed via an intake manifold to the combustion chamber or cylinder of the engine. In diesel-type engines and engines using fuel-injection arrangements, the air and fuel are conveyed separately to the combustion chamber or cylinder of the engine where they are mixed.

After the air/fuel mixture has been burnt, the resulting exhaust gases are expelled from the combustion chamber to an exhaust manifold. The exhaust gases then may be conveyed by an exhaust pipe to the catalytic converter where pollutants are removed.

The flow of air to the combustion chamber, including the flow of the air/fuel mixture if applicable, as used herein is referred to as the precombustion gas stream, and the resulting flow of exhaust therefrom is hereinafter referred to as the postcombustion or exhaust gas stream. As used herein, the precombustion and postcombustion gas streams are collectively referred to as the combustion gas stream.

Internal combustion engines which operate by the controlled combustion of fuels produce exhaust gases containing complete combustion products of carbon dioxide ($CO_2$) and water ($H_2O$) and also pollutants from incomplete combustion such as carbon monoxide (CO), which is a direct poison to human life, as well as unburnt hydrocarbons (HC). Further, due to the very high temperatures produced by the burning of the hydrocarbon fuels followed by rapid cooling, thermal fixation of nitrogen in the air results in the detrimental formation of Nitrogen Oxides ($NO_x$), an additional pollutant.

The quantity of pollutants varies with many operating conditions of the engine but is influenced predominantly by the air-to-fuel ratio in the combustion cylinder such that conditions conductive to reducing carbon monoxide and unburnt hydrocarbons (a fuel mixture just lean of stoichiometric and high combustion temperatures) cause an increased formation of $NO_x$, and conditions conductive to reducing the formation of $NO_x$ (fuel rich or fuel lean mixtures and low combustion temperatures) cause an increase in carbon monoxide and unburnt hydrocarbons in the exhaust gases of the engine. Because in modern day catalytic converters $NO_x$ reduction is most effective in the absence of oxygen, while the abatement of CO and HC requires oxygen, preventing the production of these emissions requires that the engine be operated close to the stoichiometric air-to-fuel ratio because under these conditions the use of three-way catalysts (TWC) are possible, i.e., all three pollutants can be reduced simultaneously. Nevertheless, during operation of the internal combustion engine, an environmentally significant amount of CO, HC and $NO_x$ is emitted into the atmosphere.

Although the presence of pollutants in the exhaust gases of internal combustion engines has been recognized since 1901, the need to control internal combustion engine emissions in the United States came with the passage of the Clean Air Act in 1970. Engine manufacturers have explored a wide variety of technologies to meet the requirements of this Act. Catalysis has proven to be the most effective passive system.

Automotive manufacturers have generally employed catalytic converters to perform catalysis. The purpose is to oxidize CO and HC to $CO_2$ and $H_2O$ and reduce $NO/NO_2$ to $N_2$. Auto emission catalytic converters are typically located at the underbody of the automobile and are situated in the exhaust gas stream of the engine, just before the muffler, which is an extremely hostile environment due to the extreme of temperature as well as the structural and vibrational loads encountered under driving conditions.

Nearly all auto emission catalytic converters are housed in honeycomb monolithic structures with excellent strength and crack-resistance under thermal shock. The honeycomb construction and the geometries chosen provide a relatively low pressure drop and a high geometric surface area which enhances the mass transfer controlled reactions. The honeycomb is set in a steel container and protected from vibration by a resilient matting.

An adherent washcoat, generally made of stabilized gamma alumina into which the catalytic components are incorporated, is deposited on the walls of the honeycomb. TWC technology for simultaneously converting all three pollutants comprises the use of precious or noble metals Pt and Rh, with Rh being most responsible for the reduction of $NO_x$, although it also contributes to CO oxidation along with Pt. Recently less expensive Pd has been substituted for or used in combination with Pt and Rh. The active catalyst is generally about 0.1 to 0.15% precious or noble metals, primarily platinum (Pt), palladium (Pd) or rhodium (Rh).

Because the exhaust gases of the combustion engine oscillate from slightly rich to slightly lean, an oxygen storage medium is added to the washcoat which adsorbs (stores) oxygen during an lean portion of the cycle and releases it to react with excess CO and HC during any rich portion. Cerium Oxide ($CeO_2$) is most frequently used for this purpose due to its desirable reduction-oxidation response.

The recent passage of the 1990 amendment to the Clean Air Act requires further significant reductions in the amount of pollutants being released into the atmosphere by internal combustion engines. In order to comply with these requirements, restrictions on the use of automobiles and trucks have been proposed, such as, employer-compelled car pooling, HOV lanes, increased use of mass transit as well as rail lines and similar actions limiting automobile and truck usage at considerable cost and inconvenience.

An alternative to diminished automobile and truck usage is decreasing emissions by increasing the efficiency of the internal combustion engine. This approach will have limited impact since studies show that most of automobile-originated pollution is contributed by only a small fraction of the vehicles on the road, these vehicles typically being older models having relatively inefficient engines and aging catalytic converters which inherently produce a lot of pollution. Any technological improvements to the total combustion process will not be implemented on these older vehicles is they require extensive or expensive modification to the engine or vehicle.

In addition, while considerable gains have been made in recent years to reduce the amount of pollutants in the exhaust gases of the internal combustion engine of vehicles such as automobiles and trucks, it is a considerable technological challenge and expensive to further reduce the amount of pollutants in the exhaust gases of the internal combustion, even though exhaust emissions of automobiles and trucks currently being manufactured do not meet proposed Environmental Protection Agency standards.

In lieu of decreasing exhaust emissions by increasing the efficiency of the internal combustion engine or decreasing the use of automobiles, a further alternative would be to increase the efficiency of the catalytic converter or catalysis. The conversion efficiency of a catalytic converter is measured by the ratio of the rate of mass removal of the particular constituent of interest to the mass flow rate of that constituent into the catalytic converter. The conversion efficiency of a catalytic converter is a function of many parameters including aging, temperature, stoichiometry, the presence of any catalyst poisons (such as lead, sulfur, carbon and phosphorous), the type of catalyst and the amount of time the exhaust gases reside in the catalytic converter.

Attempts to increase the efficiency of catalytic converters has not been sufficiently successful. Modern TWC catalytic converters help, but they are expensive, may have difficulty in meeting the future emission requirements, and have limitations in their performance lifetime. Catalytic converters also suffer from the disadvantage that their conversion efficiency is low until the system reaches operating temperature.

SUMMARY OF THE INVENTION

One object of the present invention is to provide a method and apparatus for reducing pollutants in the exhaust gases of an internal combustion engine without the need for major modifications to the internal combustion engine or the catalytic converter.

Another object of the invention is to provide a method and apparatus, which are inexpensive to employ and manufacture, and simple in structure and operation, for reducing pollutants of incomplete combustion in the exhaust gases of a combustion engine.

In accordance with the invention, it is believed that hydroxyl ion "OH" and other free radicals and oxidizers such as O, H, HO and $H_2O_2$ can be introduced into the combustion gas stream of a combustion engine to reduce pollutants and contaminants such as CO and HC. It has been observed that OH in the presence of oxygen can react rapidly with CO to produce $CO_2$. It has also been observed that OH in the presence of oxygen can react rapidly with hydrocarbons (HC) to produce formaldehyde or other similar intermediary products which then further react with OH to form $H_2O$, $CO_2$, and OH. Moreover, there is evidence that the series of reactions does not consume, but rather regenerates OH.

In the case of CO, the following reaction steps convert CO to $CO_2$ and regenerate OH:

$$CO+OH \rightarrow CO_2+H$$

$$H+O_2 \rightarrow HO_2$$

$$HO_2+v \rightarrow OH+O$$

The latter process of dissolution of hydroperoxyl to hydroxyl can take place either via the absorption of ultra-violet ("UV") photon or by thermal decomposition.

In the case of HC, a typical reaction set may involve the following steps:

$$HC+OH \rightarrow HCHO$$

$$HCHO+OH \rightarrow H_2O+HCO$$

$$HCO+O_2 \rightarrow CO_2+HO$$

Depending upon the HC species, there may be branching reactions and other free radical intermediaries and oxidizers such as O, H, $HO_2$ and $H_2O_2$ may be produced and either enter into the reactions directly or through the products of other reactions such as:

$$O+O_2 \rightarrow O_3,$$

or $$H_2O_2+hv \rightarrow 2OH$$

Particularly important in the present invention is that OH is believed to be regenerated in the course of the reactions, i.e., it acts as a catalyst, and that the reaction sequence proceeds rapidly due to the strong nature of the free radical reactions.

It is believed that the presence of OH, and other free radical intermediates and oxidizers such as O, H, $H_2O_2$ and $HO_2$, in the exhaust gases of a combustion engine leads, in the presence of requisite oxygen, to a very effective catalytic destruction of CO and hydrocarbons to non-polluting gas species $CO_2$ and water vapor. The OH and other related free radicals and oxidizers created in the reactions can act as a catalyst independent of or in conjunction with the normal catalytic function of the precious metal particles (Pt, Pd, Rh and combinations thereof) in the catalytic converter.

It is believed that the injection of OH into the combustion gas stream results in rapid catalyzing of CO and HC reactions in the exhaust gas stream. The reactivity of OH is believed to cause much of the catalytic activity associated with the conversion of CO to $CO_2$ and hydrocarbon to $CO_2$ and $H_2O$ to take place in the gas phase and on the large surface area of the washcoat surface of the catalytic converter. Thus, within a small region near the entrance of the catalytic converter, the bulk of the reactions converting CO and HC to $CO_2$ and $H_2O$ occurs. Because CO and the HC are oxidized in the gas phase and in the washcoat of the catalytic converter, with resulting substantial completion of the oxidation of CO and HC near the entrance to the catalytic converter, the bulk of the precious metal catalytic surface is freed from participating in these competing reactions. For example, the converter's precious metal sites no longer need to catalyze the less reactive hydrocarbon species such as methane, ethane, ethene, benzene and formaldehyde. As a result, more effective catalytic activity at the precious metal sites can be directed toward reduction of nitrogen oxides to nitrogen and other non-polluting gas species.

It is believed that the action of the hydroxyl can take place over the volume of the exhaust gas and the entire surface area of the catalytic converter, i.e., over the entire, large area of the washcoat. This makes for a much larger, effective pollutant reduction action over the catalytic converter operating in the conventional manner. Under this new mode of catalytic conversion operation, nitrogen oxide reduction can diminish below conventional baselines. Alternatively, less precious metal content, or the use of less costly metals or their oxides can be used to reduce the nitrogen oxide compounds below allowable emission limits.

Several different modes of operation and devices may be utilized to carry out the invention. In one embodiment, OH is produced in a generator using mercury (Hg) vapor lamp radiation and atmospheric air intake which is conditioned to be of sufficiently high water vapor content, and preferably to about 100% saturation. It is believed that in air of high water vapor content there are two alternative competing reaction branches for creating OH. In the first case, there is direct photodissociation of the water into OH and H by the absorption of 185 nanometer ("nm") photons. To achieve such high humidity, the water vapor can come from a heated water source or it can be supplied from the exhaust gas stream of the engine. The other reaction, which is favored at a lower, but still sufficiently high, water vapor content, is that the 185 nm ultraviolet ("UV") radiation from the lamp acts on the air to produce atomic oxygen (O) and ozone ($O_3$). The ozone is created by a three-body reaction involving atomic oxygen, molecular oxygen and any other molecular constitutent of air, such as, for example, Nitrogen ($N_2$), Oxygen ($O_2$), Water ($H_2O$) or Argon. The 253.7 nm UV radiation breaks down the ozone by photodissociation into molecular oxygen $O_2$ and a metastable oxygen atom (O). If the air stream entering the generator has sufficient water vapor content, then it is believed the metastable atomic oxygen (O) combines with water molecules to form hydrogen peroxide:

$$O+H_2O \rightarrow H_2O_2$$

Further, the 253.7 nm UV radiation photodissociates the hydrogen peroxide into two hydroxyl molecules.

The generator thus injects ozone, atomic oxygen, hydrogen peroxide, and hydroxyl into the engine via for example, the intake manifold. It is believed that any hydrogen peroxide so injected will dissociate into hydroxyl under the high engine temperature. The hydroxyl which resides in the crevice regions of the combustion chamber should survive the combustion process in the engine and act upon the CO and HC remaining in the exhaust stream to produce $CO_2$ and $H_2O$ according to the reactions described above.

A further embodiment of hydroxyl generation is to feed a water vapor-rich input air stream into a glow discharge generator (a generator in which a glow discharge occurs in water vapor primarily or only). Another approach is an overvoltage electrolysis cell to generate ozone in addition to oxygen and water vapor, followed by 200–300 nm UV exposure to create atomic oxygen by photodecomposition which in the presence of a water vapor-rich input air stream initiates hydrogen peroxide creation, followed by hydroxyl generation via UV dissolution of the hydrogen peroxide. This latter device can be very compact using a mercury vapor lamp as the UV source due to the high efficiency of the output at 253.7 nm and the high absorbability of ozone and hydrogen peroxide for UV light of this wavelength.

The foregoing embodiments principally involve generators injecting their streams of output gases into the intake manifold region of the engines. A natural advantage of such methods is that the low pressure condition in regions of the intake manifold provides a natural pumping mechanism. However, a drawback of these methods is that most of the highly chemically active species, including the free radicals such as hydroxyl, are destroyed in the combustion process and only those active species in the crevice regions and at the walls of the combustion chamber can effectively survive and enter into the exhaust gas stream where they are useful in oxidizing CO and HC. In contrast, generators which inject hydroxyl ion directly into or which create hydroxyl in the exhaust (postcombustion) gas stream can more effectively deliver the active species into the exhaust stream where CO and HC need to be oxidized. Thus, less chemically active species source strength would be required for equivalent emission reduction. This should translate directly into proportionally lower electrical input demands for the hydroxyl generator.

However, because of the higher pressures in the exhaust system, pumping is required to accomplish direct injection of the generator output into the exhaust gas stream. The use of a venturi will assist this process. Alternatively, because of the high vapor pressure of water at temperatures above approximately 120° C., using a water vapor discharge source in the hydroxyl generator can also provide effective injection. Such water vapor can be collected by condensation or equivalent means from the exhaust system.

An embodiment creating hydroxyl in the exhaust gas stream is the irradiation of the exhaust gas stream with UV radiation in the 120 to 185 nm wavelength range which in the presence of sufficient water vapor produces catalytically active OH by direct photodissociation. A still further embodiment is the use of UV radiation in the 120 to 185 nm wavelength in an external generator using atmospheric air intake and water vapor collected from the exhaust gas stream and injecting water vapor, OH and H into the exhaust gas stream prior to or in the catalytic converter.

The means described above for creation of these free radical species and oxidizers include ultraviolet light-based generators, glow discharge generators, and overvoltage electrolytic cells plus UV radiation. Generator inputs can include electricity, water, air, oxygen, water vapor, water vapor plus air and water vapor plus oxygen.

Modes of possible introduction of the above species into the engine system include into the precombustion gas stream, such as the intake manifold, into the exhaust gas stream such as the exhaust manifold, and into the catalytic converter. The generators can be external or internal to these areas. A particularly advantageous feature of the external generator is that is provides the flexibility of installing the generator at a convenient location in the engine compartment or elsewhere on the vehicle. Another advantageous feature of the external generator embodiment is that the hydroxyl could be introduced at almost any desirable point in the intake or exhaust gas streams of the engine. A further advantageous feature of this embodiment is that the flow rate of hydroxyl from the hydroxyl generator is independent of engine speed, i.e., flow of air to the combustion chamber or flow of exhaust gases from the combustion chamber. Thus, at low engine speeds, the mass flow rate of hydroxyl will not be affected by low air mass flow through the combustion chamber. For external sources, means of pumping of the generator gas products can include natural low pressure areas in the engine, introduction of ventri regions, external pumps, or natural generator pressurization as with higher temperatures and water vapor sources.

Thus, the invention employs hydroxyl and its associated reaction species, O, H, $H_2O_2$ and $HO_2$ to provide a catalytic cycle with OH playing the central role in reducing the CO and HC outputs of engines to meet present and future Ultra Low Emissions Vehicle "ULEV" and Low Emissions Vehicle "LEV" standards. Because the OH acts as a catalyst, relatively small amounts of OH need to be injected for orders of magnitude more CO and hydrocarbons to be reduced to $CO_2$ and $H_2O$ in the presence of oxygen in the exhaust gas stream.

An advantageous feature of the invention is that reduced emissions are achieved by adding hydroxyl radicals and other free radical intermediaries and oxidizers such as O, H, $HO_2$ and $H_2O_2$ to modify the composition of the exhaust gases without the need to store special chemical additives onboard.

Yet another advantageous feature of the invention is that it can be applied to a variety of different types of engines including gas turbine and internal combustion engines, including, but not limited to, automobiles, trucks, stationary power generators, motorboats, motorcycles, motorbikes, lawn mowers, chain saws or leaf blowers which may use a variety of different fuels such as gasoline, gasoline-based formulations, diesel fuel, alcohol, natural gas and any other fuel where it is desired to reduce CO and HC.

It is believed that a further advantageous feature of the present invention is that due to the introduction of gas-phase catalyst species, whose activities occur over the whole catalytic converter surface, and the inherent reactivity of these species, much earlier catalytic converter of CO and unburned HC will occur after engine start. In other words, the effective light-off delay time after engine start will be reduced as compared to the use of a typical catalytic converter.

In the case of combustion and other residential, commercial and industrial systems which have exhaust gas streams which contain volatile organic compounds (VOCs), but contain minimal or no nitrogen oxides such as one from some industrial processes, there would be no need for the typical catalytic converter and certainly no need for a precious metal catalytic converter. This invention would provide for very low cost catalytic converter systems. In those situations where only CO or HC and other VOC's are required to be oxidized, it is contemplated that a typical catalytic converter would not be required. However, it is contemplated that adequate time and/or a large surface area similar to that provided by the honeycomb structure of the typical catalytic converter would be necessary to allow the CO, HC and VOC oxidation reactions to take place.

These and other objects, advantages and features of the invention are achieved, according to one embodiment, by an apparatus comprising: 1) a combustion gas stream of an engine, 2) a catalytic converter for treating the exhaust gases in the combustion gas stream to reduce further the amount of at least one pollutant from incomplete combustion of fuel and/or oxides of nitrogen, and 3) a device for adding OH and associated free radicals and oxidizers to the combustion gas stream upstream from or at the catalytic converter to reduce further the amount of at least one pollutant in exhaust gases treated by the catalytic converter.

In accordance with the invention, a method is provided for treating exhaust gases to reduce at least one pollutant from incomplete combustion of a fuel having a precombustion gas stream of at least ambient air to the combustion chamber and a postcombustion gas stream of exhaust gases from the combustion chamber, the method comprising the steps of: adding hydroxyl and associated free radicals and oxidizers to at least one of the precombustion and the postcombustion gas streams and providing sufficient surface area in the postcombustion gas stream to allow the hydroxyl to treat the exhaust gases produced from the combustion of the fuel to at least reduce one pollutant from combustion.

DETAILED DESCRIPTION OF THE PREFERRED EMBODIMENT(S)

Figure 1:
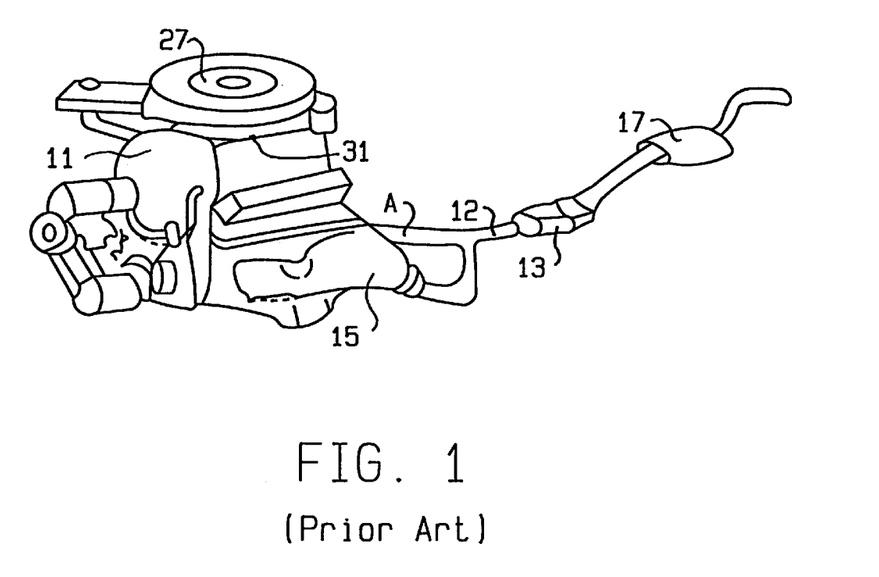
FIG. 1 is a side perspective view of an internal combustion engine having a catalytic converter.

Referring to FIG. 1, a known configuration of an automobile engine 11 having a catalytic converter 13 is illustrated. The catalytic converter 13 is positioned at the underbody of the automobile (not shown) and is situated in the exhaust gas stream A from the engine, downstream from the exhaust manifold 15 and just before the muffler 17.

The catalytic converter 13, as contemplated for use in the present invention, includes any device which is provided for treating exhaust gases from the combustion of a fuel, such as, for example, gasoline, gasoline-based formulations, diesel fuel, alcohol, natural gas and any other fuel where a catalytic converter can be used to reduce at least one pollutant from combustion, such as, for example, CO, and unburnt HC, and/or $NO_x$, including, but not limited to, a three way catalyst typically used in today's modern automobile engines.

The catalytic converter 13 therefore comprises any device that catalytically removes or participants in the removal of at least one pollutant from an exhaust stream generated by burning a fuel, including, but not limited to, those with monolithic or granular ceramic substrates, metallic substrates, or substrates of any kind, and devices with noble metals or any other type of catalytic material. It would also include, without limitation, devices having semiconductor catalysts such as oxides or sulphides of transition elements, and devices having ceramic-type catalysts, such as alumina, silica-alumina, and zeolites individually, in combination with each other and oxygen storage media such as cerium oxide or in combination with metal catalysts.

Figure 2:
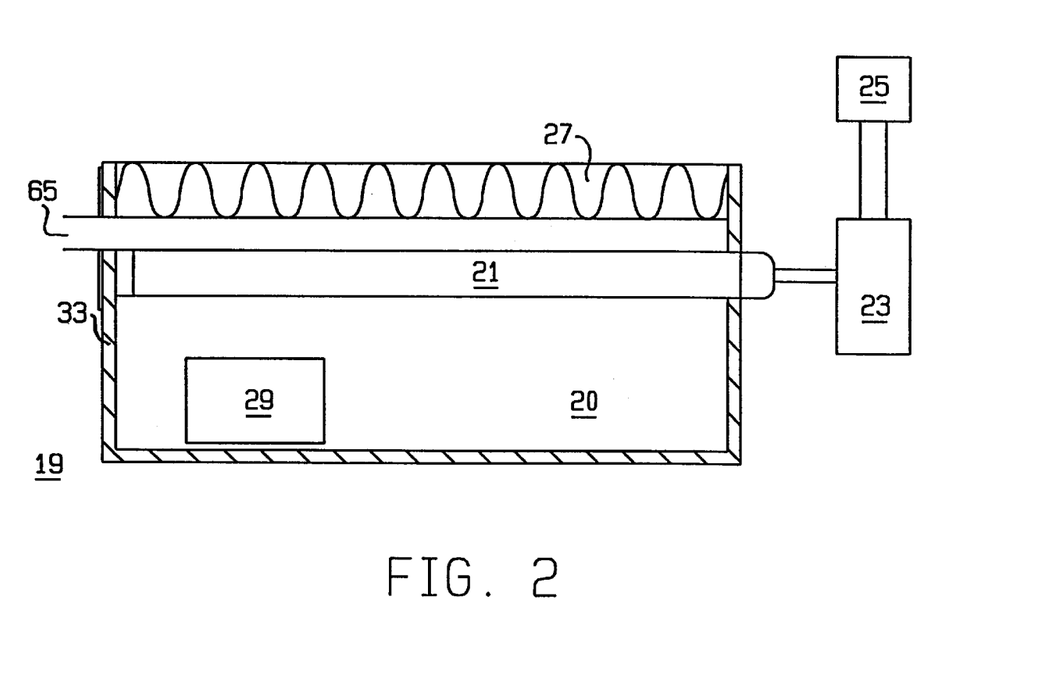
FIG. 2 is a side view, partially-in-section, illustrating one embodiment of the apparatus of the invention wherein a hydroxyl generating device is inserted into the precombustion gas streams.

Referring to FIG. 2, one embodiment of an apparatus of the invention is illustrated generally at 19. The apparatus 19 comprises a generator 20 for generating hydroxyl. In one embodiment, generator 20 has an UV light-emitting lamp 21, for example, a mercury vapor arc lamp emitting at about 185 and about 254 nanometers. The lamp has a light-transmitting envelope for transmitting UV light having wavelengths of about 100–300 nm, because this emission, in the presence of sufficient water vapor content, is capable of producing hydroxyl from air. The light transmitting envelope may be fused silica, or its equivalent synthetic quartz, supersil, sapphire or any other material capable of transmitting ultraviolet light having a wavelength down to about 100 nanometers, and preferably to at least 185 nanometers. Other UV generating lamps such as those containing Neon, Argon and combinations of these and other gases may be used.

The lamp 21 is excited by a power supply 23 capable of providing an initial electric break down of the gas within the lamp and further providing a sustaining voltage for the lamp radiant output. The lamp radiant output can be further controlled as needed by varying the lamp current. The power supply 23 is directly connected to the electrical system 25 of the automobile by splicing into the hot wire (not shown) of the system, for example, as original equipment on a new vehicle. Alternatively, the power supply 23 is connected to the electrical system 25 by using a plug adapted to be inserted into a cigarette lighter receptacle in the passenger compartment of the vehicle.

It is important in this embodiment for effective generation of hydroxyl that sufficient water vapor, and preferably about 100% saturated air, be present in the hydroxyl generator 20 utilizing the UV lamp 21 as the means to generate the hydroxyl. This water vapor may be delivered to the generator 20 via water vapor inlet passage 65. Water vapor may be supplied to inlet passage 65 by any number of alternative or combination of methods including heating water supplied from a stored bottle of water as described and illustrated with reference to FIG. 5. Alternatively, water vapor may be separated from the exhaust gas separator 43 and either directly supplied to inlet passage 65 without being collected in a water storage container, or alternatively through a storage container. Alternatively, water vapor from the exhaust gas stream can be condensed and stored in a container, and thereafter heated to form water vapor. In yet an additional alternative embodiment the exhaust gases may be supplied directly to the hydroxyl generator. As an additional alternative embodiment, the air introduced into the hydroxyl generator can be bubbled through water as described and illustrated with reference to FIG. 5. This water can be supplied from an external source or may be condensed from the water vapor present in the exhaust gas stream.

It is contemplated that air of sufficiently high water vapor content, and preferable about 100% saturated, passing through the generator 20 as provided by the embodiment of FIG. 2 will result in direct photodisassociation of the water into OH and H by the adsorption of approximately 100–185 nm photons. Alternatively, the 100–185 nm UV radiation from lamp 21 acts on the air to produce ozone and atomic oxygen. The 253.7 nm UV radiation breaks down the ozone by photodissociation into molecular oxygen and a metastable oxygen atom. The metastable oxygen combines with the water molecules present to form hydrogen peroxide which photodissociates in the presence of the 253.7 nm UV radiation into two hydroxyl molecules.

In the apparatus 19 as illustrated by FIG. 2, the lamp 21 is positioned upstream from the engine's carburetor or fuel injection system, generally indicated at 31 in FIG. 1, for example, between an air filter 27 and air intake duct 29. However, the present invention additionally contemplates positioning the generator 20 anywhere along the precombustion gas stream.

In order to increase the effective absorption coefficient of the oxygen in the air being inducted into the engine 11, the walls adjacent to the lamp 21 are provided with a surface highly reflective to ultraviolet light in the required wavelength range, for example, made of aluminum, in order to increase the mean free path of the ultraviolet light, since aluminum maintains its reflectance to ultraviolet light down to at least 185 nm.

Figure 3:
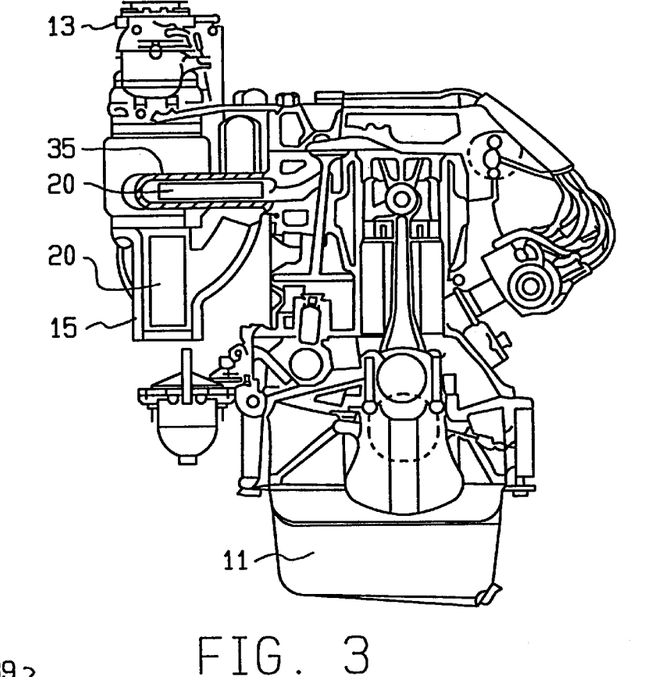
FIG. 3 is a front view, partially-in-section, illustrating further arrangements of the apparatus of FIG. 2.

According to the teaching of the present invention, it is possible to also place the hydroxyl generator 20 downstream from the engine's carburetor or fuel injection system 31 and prior to the combustion chamber, for example, in the intake manifold 35 as best seen in FIG. 3.

Figure 4:
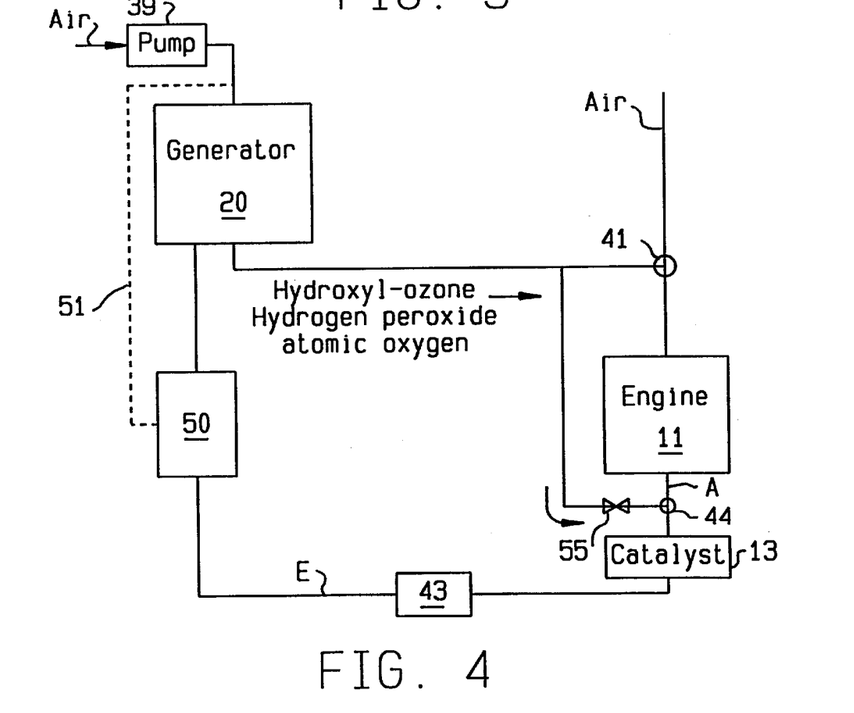
FIG. 4 is a block diagram illustrating another embodiment of the apparatus of the invention wherein the device for adding hydroxyl is positioned remotely of the precombustion and postcombustion gas streams and hydroxyl enriched air is piped into the combustion gas stream.

Referring to FIG. 4, a further embodiment of the invention is illustrated wherein the generator 20 is positioned remotely from the precombustion and postcombustion gas streams, and hydroxyl-enriched air, with other free radical intermediaries and oxidizers, is piped into the combustion gas streams. In this embodiment, hydroxyl generator 20 for generating hydroxyl from air, draws in ambient air independently of the operation of the engine, for example, using a pumping mechanism 39. The ambient air is mixed with water vapor in the generator 20 or water vapor is added to the ambient air before entering the generator and the high water vapor content air, preferably 100% saturated, is converted to hydroxyl-enriched air by exposure, for example, to UV light or by means of a corona or glow discharge device, and added to at least one of the precombustion or postcombustion gas streams in accordance with the teachings of the invention.

Water vapor container 50 delivers water vapor to generator 20 to insure that the ambient air has sufficient water vapor content, and preferably 100% saturated. The water vapor container 50 may be a storage bottle which contains water in any physical form, i.e., as a solid, liquid, gas or as water vapor. The water can be collected from the exhaust gases of the engine which produces water vapor as a result of combustion or it can be stored from an external source. If water vapor container 50 is liquid water, it can be converted to water vapor using any of the well-known method such as heating in the presence of a gas such as air, or air can be bubbled through the water to achieve the water vapor input. The water vapor and air generator wherein water or water vapor is added to the air input supplied to the generator, this embodiment being illustrated by dashed line 51 in FIG. 4. It should be noted that water container 50 is not necessary and that water vapor can be separated from the exhaust gas stream in a water vapor separator 43 and added directly to the generator or the air inlet. Alternatively, exhaust gas can be added directly to either the generator or the air and/or gas supplied to the generator.

A mixing device 41 can be used to enhance mixing of the hydroxyl-enriched air with the combustion of gas stream. It should be noted that in lieu of pumping mechanism 39, ambient air can be drawn in using the vacuum generated by the engine 11. Where the hydroxyl enriched air is introduced into the exhaust gas stream, a venturi 55 may be necessary.

Figure 5:
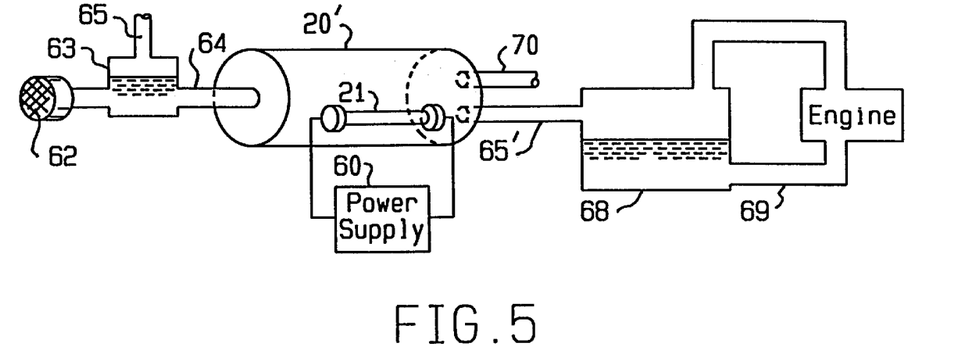
FIG. 5 is a schematic diagram showing a hydroxyl-generating system according to one embodiment of the invention.

FIG. 5 illustrates a hydroxyl generator 20 which may be utilized in the system shown in FIG. 4. Hydroxyl generator 20' has a mercury vapor lamp 21 which is connected to a power supply 60. The mercury vapor lamp 21 transmits ultraviolet light having a wavelength of 100–300 nm because this emission in the presence of sufficient water vapor content is capable of producing the needed amount of hydroxyl from air.

Air inlet canister 62 has a screen and an air filter (not shown) and supplies air to hydroxyl generator 20'. Air inlet passageway or pipe 64 delivers the air from the inlet canister 62 to the generator 20'. Air inlet passageway 64 may contain a pump (not shown) to facilitate the delivery of air to hydroxyl generator 20. It is important for effective generation of hydroxyl that sufficient water vapor, and preferably 100% saturated air, be present in the hydroxyl generator utilizing the UV lamp 21 as the means to generate the hydroxyl. This water vapor may be delivered to the generator 20' via water vapor inlet passage 65'. Water vapor inlet passage 65' can collect the water vapor from the exhaust gas stream A via passageway E utilizing water vapor separator 43 as shown in FIG. 4, or any of the other alternative methods described herein. In FIG. 5, the water vapor is supplied by heated water source 68. Heated water source 68 is an external supply of water which is circulated through the engine via circulation pipes 69 in order to heat the water supply. The water is preferably heated to or maintained at a temperature that is equal to or less than the temperature within the hydroxyl generator. Water vapor is drawn from heated water source 68 and delivered via water vapor inlet passage 65' into the hydroxyl generator 20'.

Alternatively, water vapor inlet 65 can connect the air inlet pipe 64 and both the air and water vapor can be mixed and then delivered to the hydroxyl generator 20'. Water vapor can be collected from the exhaust gas stream or the heated water source system 68, 69 can be used to supply the water vapor to water vapor inlet 65 or the alternative methods described herein can be utilized.

A further alternative embodiment for delivering sufficient water vapor to the hydroxyl generator 20' also is shown in FIG. 5. In this embodiment, water is delivered to and collected in a storage container 63 via water inlet 65. Air from air inlet canister 62 is bubbled through the water to achieve sufficient water content of humidity. The water collected in storage container 63 can be from an external source or water vapor or water from the exhaust gas stream can be condensed.

The inside surface of the hydroxyl generator 20' is provided with a surface highly reflective to ultraviolet light in the required range such as aluminum which maintains its reflectance to ultraviolet down to at least 185 nm.

It is believed that air of sufficient water vapor content, as supplied by the embodiment of FIG. 5, passing through the generator 20 will result in direct photodisassociation of the water into OH and H by the adsorption of 185 nm photons. Alternatively, the 185 nm UV radiation from lamp 21 acts on the air to produce ozone and atomic oxygen. The 253.7 nm UV radiation breaks down the ozone by photodissociation into molecular oxygen and a metastable oxygen atom. The metastable oxygen combines with the water molecules present to form hydrogen peroxide which photodissociates in the presence of the 253.7 nm UV radiation into two hydroxyl molecules.

The hydroxyl, as well as any of the free radicals and oxidizers H, O, $HO_2$, $H_2O_2$, generated by the hydroxyl generator 20' is delivered via the generator outlet 70 to the combustion gas streams. The generator output may be added to the precombustion or postcombustion gas streams. If the generator output is delivered to the postcombustion gas stream, it is anticipated that less hydroxyl output would be required for the same level of performance than if it was added to the precombustion or postcombustion gas streams. If the generator output is delivered to the postcombustion gas stream, it is anticipated that less hydroxyl output would be required for the same level of performance than if it was added to the precombustion gas stream because much of the hydroxyl, and the other free radicals and oxidizers, added to the precombustion gas stream would not survive the combustion process. The hydroxyl which survives combustion or which is delivered to the postcombustion gas stream acts upon the CO and HC in the exhaust stream to produce non-polluting $CO_2$ and $H_2O$.

Figure 6:
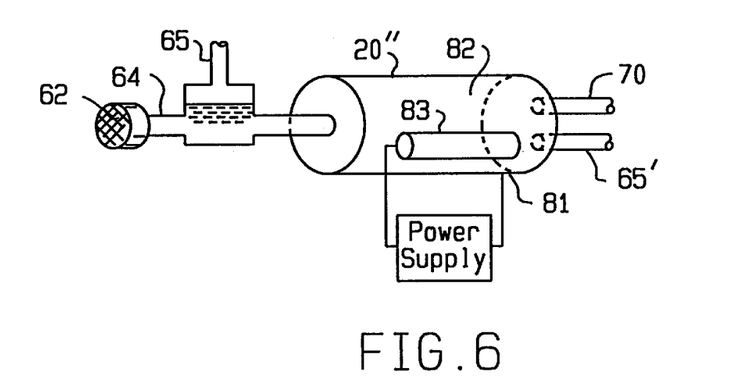
FIG. 6 is schematic diagram showing an alternative hydroxyl-generating system according to a different embodiment of the invention.

A further hydroxyl generator 20" is shown in FIG. 6. Air having sufficient water vapor is delivered to corona or glow discharge generator 20" and may be accomplished in the same manner and according to the same alternative or combination of embodiments described herein and especially when referring to FIGS. 2, 4 and 5. Generator 20" has an outer electrode 81 with an inner electrode 83. A dielectric coating or material 82 is inserted between outer electrode 82 and inner electrode 83. One lead from a high voltage, high frequency power supply is connected to the inner electrode 83 while the other lead is connected to the outer electrode 81. The hydroxyl and other products of the glow discharge generator 20" are delivered via outlet 70 to the combustion gas stream.

Figure 7:
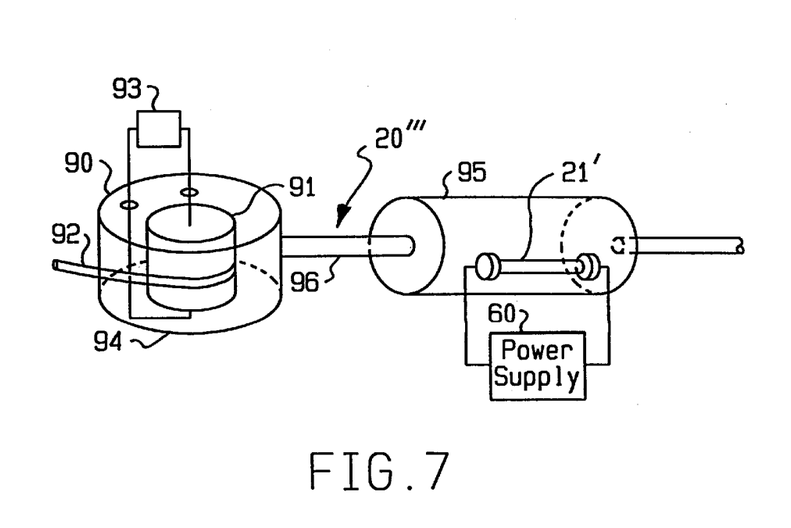
FIG. 7 is a schematic diagram of a hydroxyl generator according to a further embodiment of the invention.

FIG. 7 illustrates a different embodiment of a hydroxyl generator 20'''. Hydroxyl generator 20''' contains an ozone generator 90 for ozone generation and an ultraviolet container 95 for ozone dissociation and hydroxyl creation. The ozone generator 90 has an electrolytic cell 91 which receives water via water inlet 92. Water for the electrolytic cell 91 can be supplied from an external source which is stored or it may be condensed and collected from the water vapor in the exhaust gas stream and produced from combustion. The electrolytic cell is connected to an overvoltage power supply 93. An overvoltage electrolytic cell operates at a few tenths of a volt above the voltage condition required for the voltage threshold required for electrolysis. The electrolytic cell 91 generates ozone, oxygen and water vapor which is retained by container 94. Container 94 has an ozone, oxygen and water vapor outlet 96 which provides a passage to the ultraviolet container 95.

Ultraviolet container 95 has an ultraviolet lamp 21' which produces 253.7 nm radiation in order to dissociate the ozone into hydroxyl pursuant to the sequence of reactions described earlier in connection with FIG. 5. The ultraviolet lamp 21' is connected to a power supply 60. Unlike the ultraviolet lamp 21 in FIG. 5, lamp 21' only needs to generate UV radiation having a wavelength of above 200 nm and preferably approximately 254 nm. The inside surface of ultraviolet container 95 is provided with a surface which is highly reflective of UV radiation having a wavelength above 200 nm and preferably approximately 254 nm.

In a further alternative, lamp 21 can be mounted downstream from the engine's combustion chamber, for example, in the exhaust manifold 15 as best seen in FIG. 3. By irradiating the exhaust stream with UV radiation in the 100 to 200 nm wavelength range, in the presence of sufficient water vapor, hydroxyl will be produced by direct photodissociation.

In addition, hydroxyl generators 20, 20', 20" and 20''' can inject hydroxyl both upstream and downstream of the combustion chamber.

It should be noted that the embodiment discussed above are illustrative examples. In this regard, while the use of radiant energy to produce hydroxyl is described above, the present invention is not so limited and other devices well-known in the art which produce hydroxyl are envisioned as sources for adding hydroxyl to the combustion gas stream in accordance with the teachings of the present invention.

In addition, it should be noted that the only requirement of the present invention is that the hydroxyl is added to the combustion gas stream at a point upstream of or at the catalytic converter, for example, the air intake duct to the carburetor or fuel-injection systems of the combustion chamber, the air/fuel intake manifold to the combustion chamber, the combustion chamber directly or the exhaust manifold of the combustion chamber, or the exhaust pipe 12 as shown in FIG. 1.

Moreover, while the present invention has been described with reference to a catalytic converter, it is contemplated that only the high surface area provided by the converter in conjunction with the introduction of hydroxyl would be required to reduce the pollutants in the exhaust gases of a combustion engine.

Figure 8:
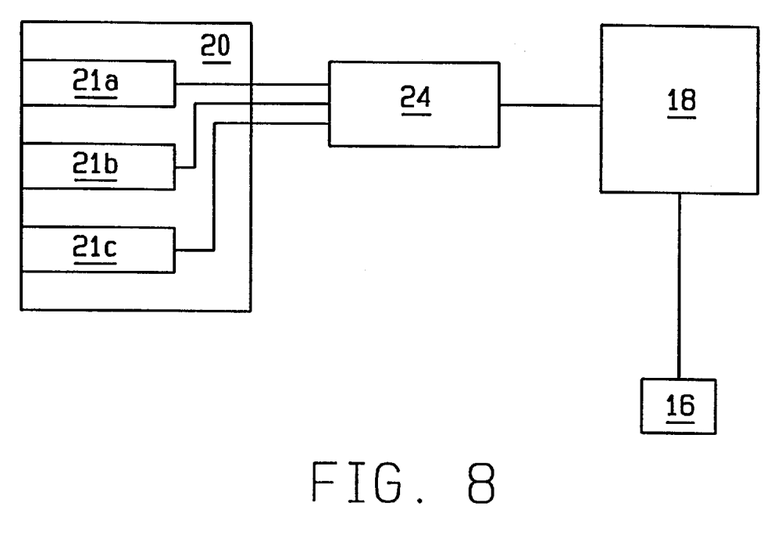
FIG. 8 is a block diagram illustrating a control arrangement for the apparatus of the present invention.

A control arrangement can be employed according to a further embodiment of the present invention as shown in FIG. 8, wherein an engine sensor 16 is installed in the system. The sensor 16 is connected to a controller 18 which can be an electronic system which is controlled by the output of engine sensor 16 or as complex as an engine control computer which analyzes the output of the sensor 16 in conjunction with other engine parameters such as load, temperature, throttle position, rpm and the like, and which can modulate the output of the hydroxyl generator 20. Alternatively, the controller 18 can vary the amount of hydroxyl generated by the hydroxyl generator 20 by varying either the voltage or current applied to the hydroxyl generator 20 by the voltage converter 24 based on inputs received from the engine sensor 16.

In an alternative embodiment a single hydroxyl generator may contain more than one ultraviolet lamp 21a, 21b, 21c which each convert air to hydroxyl at a level that is less than required for complete elimination of pollutants produced by combustion of a fuel. One lamp 21a is operated when determined necessary, such as when the engine is operating, and the other lamp 21b is modulated depending upon operating parameters as measured by the engine sensor 16.

In this embodiment, a controller 18 is connected to an engine sensor 16 to receive an input indicative of the current engine operating parameters or conditions. When the controller 18 senses an engine condition or parameter, such as engine speed or engine load at or above a predetermined level, the controller 18 modulates lamp 21b and the output of the hydroxyl generator. In addition to a two generator or two lamp configuration, a plurality of generators or lamps can be used such that one generator or lamp is continuously operated when the engine is operating and each additional generator or lamp is turned on in succession as different and increasing levels of engine operating conditions or parameters, such as rotation of the engine or engine load, are sensed by the controller 18 so that all the generators or lamps are operating when the engine parameter or condition, such as speed or engine load, is at the highest predetermined level and sufficient hydroxyl is generated to assure no excess pollutants are generated.

In a similar arrangement, instead of a plurality of lamps 21, a plurality of sets of inner electrodes 83 and outer electrodes 82, or a plurality of ozone generators 90 and ultraviolet light containers 95, or a plurality of lamps 21' can be utilized.

Alternatively, a single lamp 21 can be employed and the controller 18 can vary the amount of hydroxyl generated by the lamp 21 by varying either the voltage or current applied to the lamp 21 by the voltage converter 24 based on inputs received from the controller 18.

Figure 9:
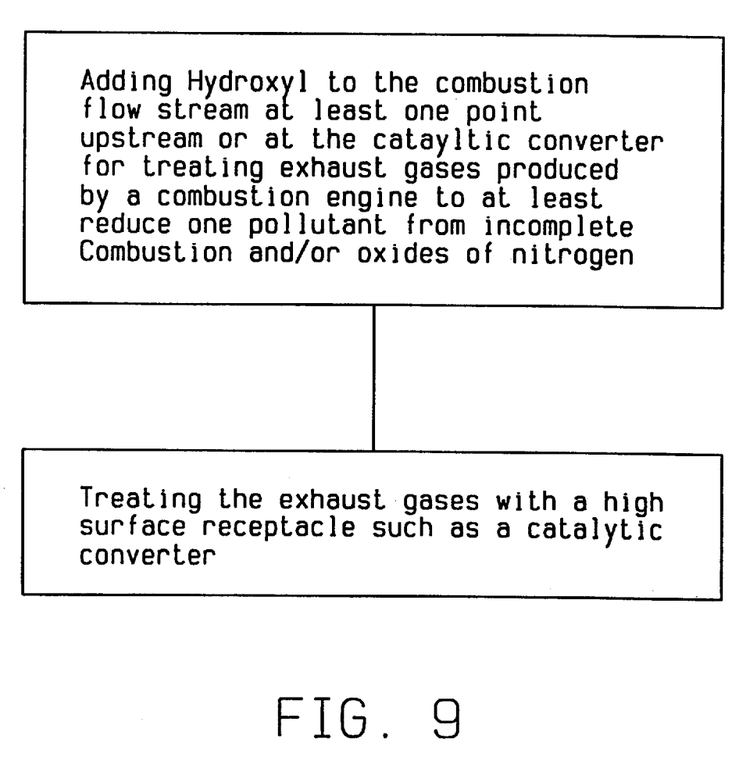
FIG. 9 is a block diagram illustrating the method of the invention.

Referring to FIG. 9, the method of the present invention is illustrated and comprises the steps of: 1) adding hydroxyl to the combustion gas stream at a point upstream from a high surface area receptacle, and 2) passing the exhaust gases through a high surface area receptacle such as, for example, a typical automotive catalytic converter.

Although the present invention has been described with particular reference to its preferred embodiments, it should be understood that many variations and modifications will now be obvious to those skilled in the art and, therefore, the scope of the invention should not be limited, by the specific disclosure herein, but only by the appended claims.

What is claimed:

1. An apparatus for decreasing at least one pollutant selected from the group consisting of products of incomplete combustion of fuel and oxides of nitrogen from a first concentration to a second lower concentration in an exhaust gas stream containing exhaust gases formed from the combustion of fuel in an internal combustion engine, the apparatus comprising:

a combustion chamber configured to have a pre-combustion gas stream to the combustion chamber and a post-combustion gas stream of exhaust gases from the combustion chamber;

at least one generator which produces hydroxyl radicals, at least a portion of which is located in at least one pre-combustion gas stream and the post-combustion gas stream;

a power supply which supplies high frequency power to the generator; and catalytically active material, wherein at least a portion of the catalytically active material is located downstream from the generator.

2. The apparatus according to claim 1, wherein the generator includes an ultraviolet lamp having a wavelength between about 100 and about 200 nanometers.

3. The apparatus according to claim 1, wherein the generator includes an electric discharge device.

4. The apparatus according to claim 3, wherein the dielectric discharge device, comprises:

at least one first electrode;

at least one second electrode;

at least one dielectric barrier positioned between the first electrode and the second electrode.

5. The apparatus according to claim 1, wherein the generator is located in the post-combustion gas stream such that a substantial portion of the catalytically active material is located downstream from the generator.

6. The apparatus according to claim 5, wherein the power supply provides low power.

7. The apparatus according to claim 6, wherein the power supply provides up to about 40 watts of power.

8. The apparatus according to claim 1, wherein the generator is adapted and configured to be powered substantially whenever exhaust gases are produced.

9. The apparatus according to claim 8, used in the treatment of exhaust gases produced by the engine of a mobile vehicle.

10. The apparatus according to claim 9, wherein the catalytically active material is contained in a catalytic converter.

11. The apparatus according to claim 10, wherein the decrease in the at least one pollutant occurs substantially within the catalytic converter.

12. The apparatus according to claim 8, wherein the internal combustion engine is a spark ignition engine.

13. The apparatus according to claim 12, adapted and configured to treat exhaust gases produced from the combustion of fuel at or substantially near stoichiometric conditions.

14. The apparatus according to claim 8, wherein the internal combustion engine is a diesel engine.

15. The apparatus according to claim 8, operated in the absence of any reducing agent added to the exhaust gases in at least one of the pre-combustion gas stream and post-combustion gas stream prior to the generator.

16. The apparatus according to claim 15, wherein the power supply provides alternating current at a frequency of at least about 1000 Hz.

17. The apparatus according to claim 15, wherein the catalytically active material is contained substantially within a catalytic converter, wherein the catalytic converter is separated from the generator and located a predetermined distance downstream from the generator.

18. The apparatus according to claim 15, wherein the generator is located in the post-combustion gas stream.

19. The apparatus according to claim 1, wherein the power supplied to the generator is from about 0.01% to about 0.1% of the rated engine power.

20. A method for decreasing at least one pollutant selected from the group consisting of products of incomplete combustion of fuel and oxides of nitrogen from a first concentration to a second lower concentration in an exhaust gas stream containing exhaust gases formed from the combustion of fuel in an engine having a pre-combustion flow stream to the engine and a post-combustion flow stream from the engine, the method comprising the steps of:

positioning at least a portion of at one generator which produces hydroxyl radicals in at least one of the pre-combustion and post-combustion flow streams;

providing high frequency current to the generator; and providing catalytically active material in the post combustion flow stream, wherein at least a portion of the catalytically active material is located downstream from the generator.

21. The method according to claim 20, wherein the generator includes an ultraviolet lamp having a wavelength between about 100 and about 200 nanometers.

22. The method according to claim 20, wherein the generator includes an electric discharge device.

23. The method according to claim 22, wherein the power supply provides low power.

24. The method according to claim 23, wherein the power supply provides up to about 40 watts of power.

25. The method according to claim 22, wherein the electric discharge device, comprises:

at least one electrode;

at least one second electrode; and at least one dielectric barrier positioned between the first electrode and the second electrode.

26. The method according to claim 20, wherein the generator is located in the post-combustion gas stream such that a substantial portion of the catalytically active material is located downstream from the generator.

27. The method according to claim 20, wherein the generator is adapted and configured to be powered substantially whenever exhaust gases are produced.

28. The method according to claim 27, used in the treatment of exhaust gases produced by the engine of a mobile vehicle.

29. The method according to claim 28, wherein the catalytically active material is contained in a catalytic converter.

30. The method according to claim 29, wherein the decrease in the at least one pollutant occurs substantially within the catalytic converter.

31. The method according to claim 27, wherein the internal combustion engine is a spark ignition engine.

32. The method according to claim 31, adapted and configured to treat exhaust gases produced from the combustion of fuel at or substantially near stoichiometric conditions.

33. The method according to claim 27, wherein the internal combustion engine is a diesel engine.

34. The method according to claim 27, wherein the method is carried out in the absence of any reducing agent added to the exhaust gases prior to the generator.

35. The method according to claim 34, wherein the power supply provides alternating current at a frequency of at least about 1000 Hz.

36. The method according to claim 34, wherein the catalytically active material is contained substantially within a catalytic converter, wherein the catalytic converter is separate from the generator and located a predetermined distance downstream from the generator.

37. The method according to claim 34, wherein the generator is located in the post-combustion gas stream.

38. The method according to claim 20, wherein the power supplied to the generator is from about 0.01% to about 0.1% of the rated engine power.

* * * * *